United States Patent Office 3,558,390
Patented Jan. 26, 1971

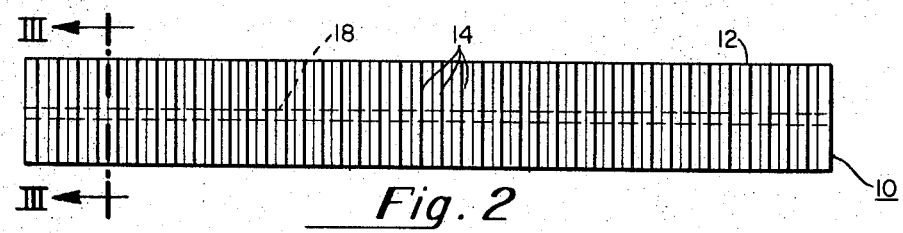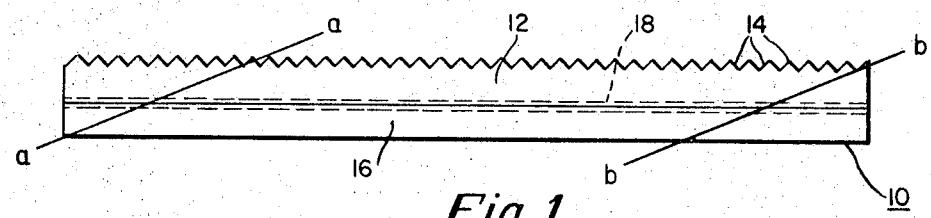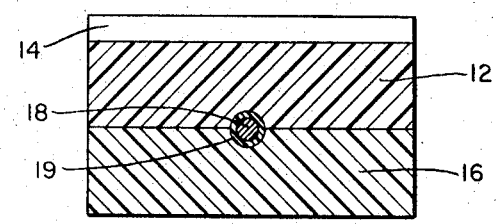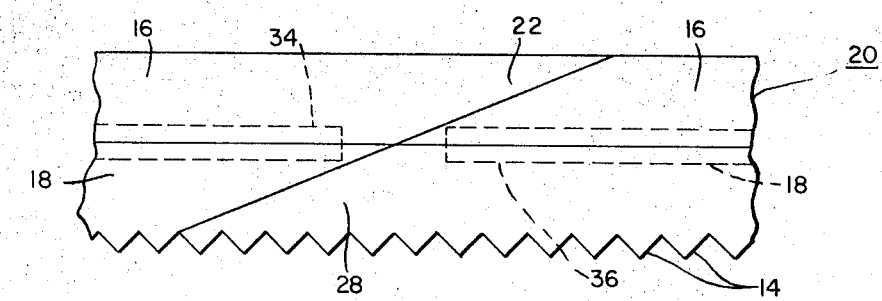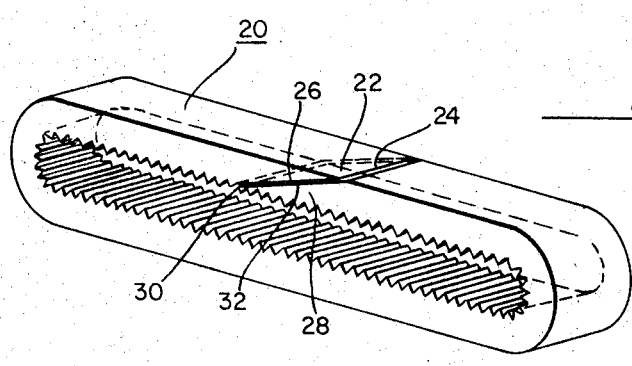
INVENTOR.
FERNAND HABEGGER
BY
Paul + Paul
ATTORNEYS.

3,558,390
PROCESS FOR MANUFACTURING POWER TRANSMISSION BELTS OF SYNTHETIC MATERIAL
Fernand Habegger, Biel-Benken, Switzerland, assignor to Habasit Ltd., Reinach-Basel, Switzerland, a corporation of Switzerland
Filed Feb. 7, 1967, Ser. No. 614,455
Int. Cl. B29d 29/02
U.S. Cl. 156—137
6 Claims

ABSTRACT OF THE DISCLOSURE

A coating of synthetic material is bonded to the armor of a belt comprising two strips of synthetic material. The coated armor is sandwiched between the strips of synthetic material and the armor and strips of synthetic material are then bonded together to form a length of belting. The length of belting is then formed into an endless belt by fusing or bonding together opposed opposite end portions of the strips of synthetic material, without bonding the armor.

BACKGROUND OF THE INVENTION (1) Field of the invention

This invention relates generally to a process of manufacturing power transmission belts of synthetic material and particularly to an improved process of manufacturing such belts which are endless and not stretchable to any appreciable degree.

(2) Description of the prior art

In many uses, power transmission belts made entirely of certain synthetic materials are highly advantageous. They give efficient overall performance, and, due to their light weight and high resistance to oils, are very useful in many environments. In addition, opposite end portions of a length of belting may be cut to wedge shape, overlapped and spliced by being permanently fused or bonded together to form an endless belt. However, the length of the belt is subject to change due to use and changes in atmospheric conditions. Even a slight change in belt length may be undesirable, in consequence of which when it is desired to avoid any appreciable change in belt length, it is common practice to provide the belt with endless wire armor extending longitudinally of the belt. It is necessary to make the armor endless because difficulty is experienced when it is attempted to bond the armor directly to the belt. The bond is not intimate or strong enough to permit the use of armor which is not endless. The endless armor effectively prevents any appreciable change in belt length, but it may give rise to serious problems when the belt is installed for if the belt is not of the correct length, nothing can be done conveniently to change it.

SUMMARY

I have discovered that the bare armor should not be bonded directly to the belt. Instead, a coating of synthetic material should be permanently bonded to the armor and then the coated armor should be bonded to the belt. When this is done, the resulting bond between the armor and the belt is unusually intimate and sufficiently strong to preclude any significant elongation of the belt, even if the armor is not endless.

In the accompany drawings:

FIG. 1 is a view looking at an edge extending along one side of a section of belting cut from a length thereof furnished by the manufacturer;

FIG. 2 is a plan view of the section of belting shown in FIG. 1;

FIG. 3 is an enlarged section on the line III—III in FIG. 2;

FIG. 4 is a perspective view of an endless belt made from the section of belting shown in FIGS 1 to 3; and FIG. 5 is an enlarged fragmentary view looking at an edge of the endless belt shown in FIG. 4 and particularly at the spliced opposite end portions thereof.

Referring particularly to FIGS. 1 to 3, the exemplary power transmission belt fabricated in accordance with the invention is made from a section 10 of power transmission belting severed from a continuous length thereof furnished by the manufacturer. The belting 10 comprises an inner layer or strip 12 of synthetic material having on one face thereof a series of parallel transversely extending teeth 14 designed to mesh with the teeth of the pulleys about which the belt is to be trained. Underlying the inner layer 12 is an outer layer or strip 16 of synthetic material of the same width. Between the layers 12 and 16 is armor in the form of a flexible metal wire or cable 18 provided with a coating of synthetic material designated 19. The layers 12 and 16 and the coating 19 and wire 18 are permanently fused or bonded together. It will be understood that although only one wire or cable 18 is shown sandwiched between the layers 12 and 16, a plurality of such wires or cable may be utilized.

The layers 12 and 16 and the coating 19 with which the wire 18 is provided may be made of any of the synthetic materials, whether thermoplastic or thermosetting, now commonly used in the manufacture of power transmission belts made of synthetic materials. These materials are characterized, of course, by their ability to flex. Both polyamides and polyesters have been used successfully. The layers 12 and 16 and the coating 19 preferably are of the same synthetic material in order to promote intimate fusion thereof.

Referring particularly to FIGS. 4 and 5, the endless belt, designated 20, made from the section of power transmission belting 10 is provided with an end portion 22 feathered to wedge shape. The wedge-shaped portion 22 has a sharp terminal edge 24 and a flat surface 26 extending from the edge 24 on the outer face of the belt back therefrom to the inner face of the belt. The belt 20 is also provided with an opposite end portion 28 feathered to wedge shape. The wedge-shaped portion 28 has a sharp terminal edge 30 and a flat surface 32 extending from the edge 30 on the inner face of the belt back therefrom to the outer face of the belt.

In the fabrication of the belt, the wire 18 is electrically heated to a temperature of from 200° to 400° C. and passed through an atmosphere of powdered synthetic material. When the synthetic material is a polyamide a temperature of 350° C. is suitable. Thus the wire 18 receives an overall coating of the synthetic material intimately and permanently fused, sintered or heat-bonded to the surface of the wire.

The coated wire 18 is then laid or sandwiched between the layers 12 and 16, and heat and pressure are applied to the assembly to permanently fuse or heat-bond the layers 12 and 16 and the coating 19 together. The pressure required is 20 to 40 kilograms per square centimeter, and the temperature required is from 80° to 150° C. When the synthetic material is a polyamide a pressure of 20 kilograms per square centimeter and a temperature of 130° C. are suitable. Depending upon the synthetic material used, it may be necessary to coat the faces of the two layers 12 and 16 with a solvent or a resin or to apply high frequency or ultrasonic energy to effect the desired fusing or bonding.

The section of belting 10 may be severed from a length of belting furnished by the manufacturer, after the actual spacing and sizes of the pulleys are checked in the field. The section of belting 10 is then dressed by cutting the same along the parallel planes indicated A—A and B—B in FIG. 1, whereby to form the wedge-shaped opposite end portions 22 and 28. These opposite end portions are then turned back toward each other, overlapped and placed with their surfaces 26 and 32 engaging, whereupon heat is applied to effect fusing or bonding of the surfaces 26 and 32. When the synthetic material is a polyamide a temperature of 100°–130° C. is suitable. The opposite end portions of the wire 18, designated 34 and 36, are not connected together. They are either cut off flush with the surfaces 26 and 32 or cut so that they set back therefrom, as shown in FIG. 5.

In use, the wire 18 serves only to prevent linear elongation of the belt. Therefore, it is not necessary to connect its opposite end portions 34 and 36. The load applied to the belt should be limited to the load which the synthetic material alone will take safely, and the load capacity of the wire 18 need not be greater than that of the synthetic material alone.

It is not essential that the armor take the form of one or more continuous metal wires 18. Short lengths of wire conjointly extending the full length of the section of belting 10, with ends unconnected but overlapping, may be used instead. In addition, a continuous length of metal wire fabric may be used. Furthermore, it is within the purview of the present invention to use armor in the form of fibers of asbestos, glass or other minerals.

The transverse section of the wire 18 need not be circular, as described and illustrated. In fact, any shape may be used—flat, square, hexagonal, etc.

Although armor 18 has been shown and described as being sandwiched between two strips or plies 12 and 16 of synthetic material, it will be understood that three or more plies may be used, with armor sandwiched between each adjacent pair of plies.

The outer layer 16 may be molded or extruded since it is uniform in transverse section. The inner layer 12 is molded because it bears the teeth 14. However, the teeth 14 may be omitted and, instead, the inner face of the layer 12 given any desired profile. In addition, it may be lined with canvas, impression cloth or platens. In the event that the layer 12 is uniform in transverse section, it too may be extruded.

It will be understood, of course, that the present invention is susceptible to various changes and modifications which may be made without departing from the real spirit or general principles thereof, and it is accordingly intended to claim the same broadly, as well as specifically, and indicated in the appended claims.

What is claimed is:

1. In a process of manufacturing endless power transmission belts of synthetic material armored to prevent linear elongation, the steps comprising:
    (a) permanently fusing or bonding to the armor a coating of synthetic material,
    (b) arranging said armor between strips of synthetic material so that the component parts thereof operatively extend conjointly the full length of said strips,
    (c) permanently fusing or bonding said strips and coated armor together to form a length of belting, and
    (d) bringing the opposite portions of said belting together and splicing the same by fusing or bonding the synthetic material, leaving the armor unconnected at said splice, except through said spliced synthetic material, wherein the coating of synthetic matter is applied to the armor by heating said armor and passing it through an atmosphere laden with a powder of the synthetic material.

2. The process according to claim 1 wherein the armor is of metal wire heated electrically to a temperature of approximately 200–400 degrees C.

3. The process according to claim 1 wherein the synthetic material is a polyamide and the armor is of metal heated electrically to a temperature of approximately 350 degrees C.

4. In the process of manufacturing endless substantially stretchfree power transmission belts of synthetic material armored to prevent linear elongations, the steps comprising:
    (a) permanently fusing or bonding to the armor a coating of synthetic material,
    (b) arranging said armor between strips of synthetic material so that the component parts thereof operatively extend conjointly the full length of said strips,
    (c) permanently fusing or bonding said strips, coated armor together to form a length of belting,
    (d) then cutting back the armor in length to have a total length that is less than the effective circumferential length of the completed belt, and
    (e) bringing the opposite end portions of said belting together and splicing the same by fusing or bonding the synthetic material, leaving the armor unconnected at said splice, except through said spliced synthetic material.

5. The process of claim 4, wherein the step of fusing or bonding the coating to the armor comprises applying the synthetic material coating to armor of asbestos material.

6. The process of claim 4, wherein the step of fusing or bonding the coating to the armor comprises applying the synthetic material coating to armor of glass fiber material.

References Cited

UNITED STATES PATENTS 2,446,310  8/1948  Steinke _____ 156—137

FOREIGN PATENTS 229,518  7/1960  Australia _____ 156—137

CARL D. QUARFORTH, Primary Examiner

B. H. HUNT, Assistant Examiner

U.S. Cl. X.R.

74—232, 237; 156—124, 272